United States Patent
Crocitti et al.

(10) Patent No.: US 6,870,577 B2
(45) Date of Patent: Mar. 22, 2005

(54) PROCESS FOR MANAGING A MEMORY IN A TELEVISION RECEIVER AND TELEVISION RECEIVER

(75) Inventors: Valérie Crocitti, Saint Armel (FR); Pierre Houeix, Cesson-Sévigné (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 393 days.

(21) Appl. No.: 09/741,717

(22) Filed: Dec. 20, 2000

(65) Prior Publication Data

US 2001/0006403 A1 Jul. 5, 2001

(30) Foreign Application Priority Data

Dec. 30, 1999 (FR) .......................................... 99 16742

(51) Int. Cl.[7] ................................................ H04N 9/64
(52) U.S. Cl. ...................... 348/718; 348/714; 348/460; 348/553
(58) Field of Search ................................ 348/714, 716, 348/718, 725, 906, 553; 725/39, 80, 82, 85, 132, 139, 140, 142, 151, 152, 133, 141, 134, 153

(56) References Cited

U.S. PATENT DOCUMENTS

| | | | |
|---|---|---|---|
| 5,038,211 A | * | 8/1991 | Hallenbeck ................. 348/460 |
| 5,635,979 A | | 6/1997 | Kostreski et al. ............. 348/13 |
| 5,652,613 A | | 7/1997 | Lazarus et al. ................ 348/7 |
| 5,917,481 A | * | 6/1999 | Rzeszewski et al. ........ 348/906 |
| 6,104,389 A | * | 8/2000 | Ando ......................... 348/906 |
| 6,230,163 B1 | * | 5/2001 | Thijssen ..................... 707/200 |
| 6,615,365 B1 | * | 9/2003 | Jenevein et al. ............... 714/6 |

FOREIGN PATENT DOCUMENTS

WO  WO99/25119  5/1999  .......... H04N/5/445

OTHER PUBLICATIONS

French Search Report citing the above-listed references: AA, AB, and AM.

* cited by examiner

Primary Examiner—John Miller
Assistant Examiner—Trang U. Tran
(74) Attorney, Agent, or Firm—Joseph S. Tripoli; Joseph J. Laks; Robert D. Shedd

(57) ABSTRACT

Television receiver furnished with a memory (21, 22, 23) for receiving service data comprising a processing module (11) which correlates usage criteria received together with the service data and storage criteria characterizing the memory or memories of the receiver. By correlating the two criteria, the module determines the conditions of storage.

Advantageously, a reorganizing module (12) can process the content of the memory so as to free some space in order to store new service data.

The invention also relates to the storage process.

12 Claims, 2 Drawing Sheets

PROCESS FOR MANAGING A MEMORY IN A TELEVISION RECEIVER AND TELEVISION RECEIVER

FIELD OF THE INVENTION

The present invention relates to a process for managing a memory in a television receiver and a television receiver.

BACKGROUND

Television systems are known which comprise in particular a television using digital technology and allowing a user to benefit from interactive services offered by specific providers. These services are transmitted either by way of the frame flyback signal within the domain of analogue television, or in digital data packets within the domain of digital television. These services are available via computer applications which are either stored on storage means installed in the television, or downloaded and then executed by a specific electronic device of the television. To avoid having to reload the data, the storage can be performed in a retentive memory.

However, each interactive service requires the recording of data, even when the corresponding application is not currently being executed. Consequently, it is necessary to provide storage means which are either local or remote but can be accessed by the television. However, these storage means afford limited storage capacity. Consequently, the storage means may be saturated. The solution consisting in increasing the dimensions of the storage means is not satisfactory in so far as the number of applications tends to increase and/or to require a bigger memory space and in so far as the storage means give rise to extra cost and additional bulk.

The object of the present invention is therefore to alleviate the drawbacks of the prior art by providing an automatic memory management system for interactive service applications.

SUMMARY OF THE INVENTION

This goal is achieved by a television receiver furnished with a memory (21,22,23) intended to contain service data, wherein it furthermore includes means of reception of said service data and of usage criteria associated with the usage of these service data, a processing module (11) able to correlate the usage criteria of said service data and storage criteria characterizing the memory with a view to determining the conditions of storage of the service data in said memory, the processing module being activated automatically on receipt of said service data and of the associated usage criteria.

In another embodiment, the television receiver includes an evaluation module (13) making it possible to determine the characteristics of the storage means (21, 22, 23) relating in particular to the space available and the information processing time, the result of the evaluation being stored and accessible by the processing module.

In another embodiment, the television receiver includes a reorganization module (12) carrying out the analysis of the usage of the storage means (21, 22, 23) so as to trigger a procedure for reorganizing the allocation of the stored information so as to free some storage space on the storage means (21, 22, 23) while complying with the constraints related to the usage of the information stored.

Another object of the present invention is a process for managing a memory of a television receiver wherein it includes the following steps:

reception of service data and of usage criteria associated with the usage of these data, searching in the receiver for storage criteria characterizing the memory, correlation of the usage and storage criteria with a view to determining the conditions of storage of the service data in said memory.

In another embodiment, the process for managing the retentive memory includes:

a step of reorganizing the storage space of the storage means (21, 22, 23), so as to improve access to the information stored and/or to free some available space for storage.

In another embodiment, the reorganizing step is carried out automatically during a specified period of non-usage of the television or as soon as a storage request is received.

In another embodiment, the reorganizing step comprises a step of compressing the stored data by applying a compression algorithm.

BRIEF DESCRIPTION OF THE DRAWINGS

The invention, together with its characteristics and advantages, will emerge more clearly from reading the description given with reference to the appended drawing in which.

DETAILED DESCRIPTION

As explained earlier, the invention lies in the domain of television. This technology allows a user to gain access to interactive services, by way of computer applications executed by a microprocessor device of the television set. These computer applications require, in general, configuration parameters used when starting up the application. These configuration parameters must be retained in memory store and depend, for example, on the user and on the television set. Likewise, certain interactive services may require the user to input, via appropriate means, personal parameters for operating an interactive service. These parameters may be the personalization of the graphics interface of the service. To avoid the user having to perform the personalization of the interactive service with each usage, these personalization parameters need to be retained in memory store. Likewise, the need for a retentive memory arises when the interactive services are, for example, games. In this case, the best scores of the various players need to be kept, in particular by retaining them in memory store. Likewise, as appropriate, the code of the applications allowing implementation of the interactive services can be retained in memory store.

Figure 1:
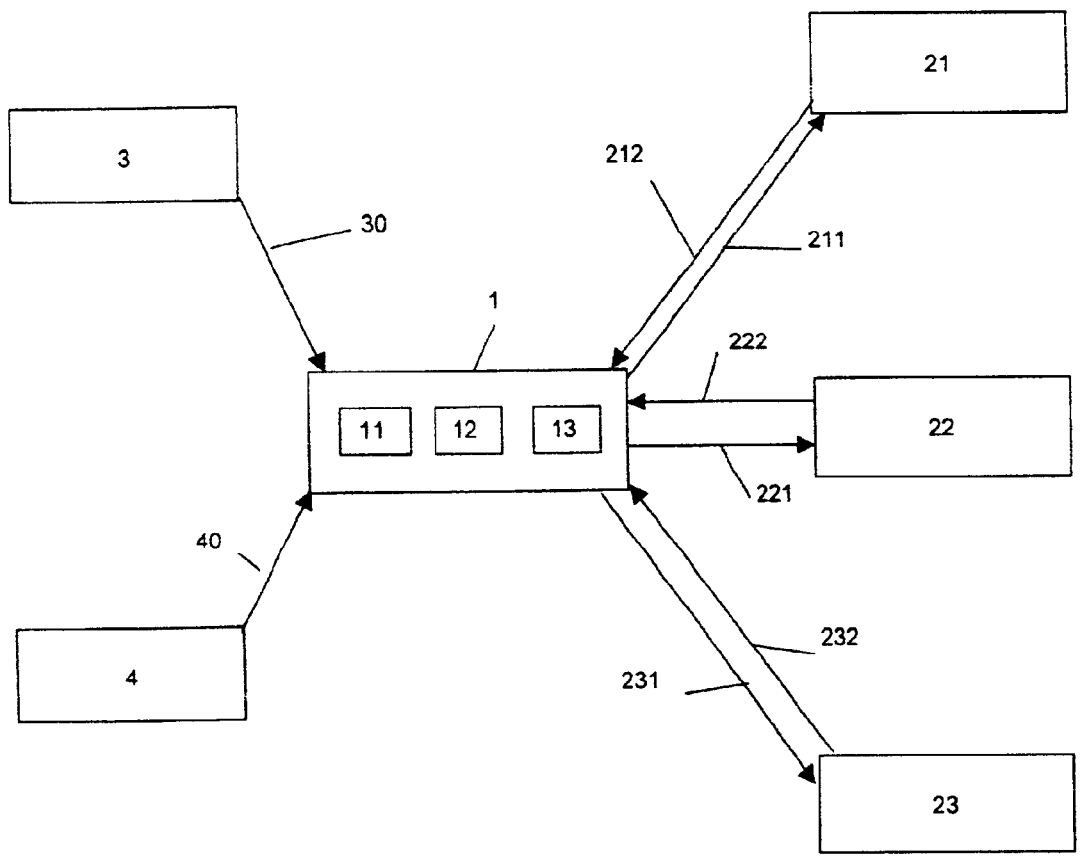
FIG. 1 represents an operating diagram of the system according to the invention.

The present invention will now be described with reference to FIG. 1.

As explained earlier, it is difficult to evaluate the capacity of the storage means (21, 22, 23) during construction of the television since the number of services and the quantity of information to be stored for each service is not defined definitively and may change rapidly.

Specifically, the television manufacturer is generally aware of the needs of a few interactive service providers in terms of memory requirement. Consequently, when a user of the television wishes to benefit from interactive services from a provider initially unknown to the manufacturer, this provider's requirements are not taken into account in determining the capacity of the storage means (21, 22, 23).

As explained earlier, the solution consisting in increasing the capacity of the storage means as and when requirements arise is not satisfactory in so far as these storage means are relatively expensive, voluminous and that their renewal requires the intervention of a technician. Another conceivable solution would be to let the user of the television manage the usage of the storage means. This solution, comparable to the management of the memory of a personal computer, is not desirable in so far as the user of the television is not necessarily trained for this management and that moreover the user does not wish to have the burden of this management.

According to the prior art, the storage means of a digital television system comprise a local retentive memory (21) installed in the television, for example of non-volatile memory type, and/or an external memory (22) connected to the television set and/or a remote server (23) provided with storage means and connected to the television set, for example by a telephone link and a modem built into the television set. It is clear that each of the storage means (21, 22, 23) possesses different characteristics. Thus, the quantity of storable information, the access time and the speed of processing or the rate of transfer of the stored information are different from one storage means to another. The characteristics of the storage means (21, 22, 23) constitute constraints (212, 222, 232) which interfere in the choice of the allocation (211, 221, 231) of an item of information in the storage means when a new item of information or new data need to be stored.

According to the invention, the memory management system builds in the performance of the various storage means so as to allocate the memory space necessary to store new information in the most suitable storage means (21, 22, 23).

Specifically, the definition of the usage constraints or of the characteristics of the information stored can be put in place so that the choice of storage means on which this particular information is to be stored is conditioned by these constraints. In the system according to the invention, these constraints are taken into account upon a request (30, 40) asking for the storage of new information. A request (30, 40) can be issued by a service provider (4) or by the user (3).

In order to manage the demands (30, 40) for storing information originating from an interactive service provider (4) or from the user (3), the system according to the invention comprises a computer program (1), for example, stored locally in the television set, including a plurality of executable modules (11, 12, 13). Each executable module (11, 12, 13) carries out a different, but complementary, activity making it possible to take into account and automatically satisfy the demands (30, 40) for storing information while complying with the constraints fixed during the request (30, 40).

A first module (11), called the processing module, receives and analyses each information storage request (30, 40). This processing module (11) has access to all the information relating to the constraints of usage of the information item to be stored, which item is contained in the request. This module also has access to the characteristics of the storage means (21, 22, 23) relating in particular to the available space remaining on the various storage means and the processing speed. The processing module (11) then carries out a comparison between the constraints of storage of the information item and the characteristics of the storage means (21, 22, 23).

This comparison makes it possible to verify whether the new information item forming the subject of a request (30, 40) can be stored without modifying the state of the information already stored in the storage means, that is to say without erasing or shifting the information already stored. If such is the case, the processing module (11) allocates the necessary available space on the most suitable storage means, as a function of the usage constraints for the new information item. In the converse case, that is to say when the characteristics of the storage means do not allow the storage of the new information item while complying with the fixed constraints, the processing module triggers a second module called the reorganization and optimization module (12).

This reorganization module (12) analyses the usage of the storage space of each storage means (21, 22, 23) so as to assign each information item already stored a storage space, in the most optimal manner possible while complying with the usage constraints for each information item. Likewise, this reorganization module (12) verifies the date of validity of each information item stored and deletes all the information items whose duration of validity is exceeded. This date of validity also constitutes an information storage constraint, and can be expressed, either in the form of an expiry date, or in the form of a duration of validity whose start date is the date of storage of the information item or the date of last usage. To do this, the reorganization module (12) consults a clock in order to verify the duration of validity.

Likewise, the reorganization module (12) can use a data compression algorithm to free some storage space on each of the storage means. The compression algorithms are employed by the reorganization module (12) only in so far as some available storage space is necessary and in so far as the information usage constraints are complied with.

In one embodiment of the invention, the reorganization module (12) can be triggered automatically during periods of non-usage of the television set or as soon as a storage request is received by the program (1) for managing the television set.

The usage constraints for the information item to be stored or the characteristics of this information item are used essentially by the processing module (11) and by the reorganization module (12) in order to determine the best possible location in one of the storage means (21, 22, 23). The expression best location should be understood to mean a memory allocation area in respect of which the usage constraints for the information item to be stored and the characteristics of this information item are complied with, either fully, or partially, but sufficiently to permit an operational usage of the information item.

The determination of the placement of a new information item depends, on the one hand on objective criteria, for example, its size and the maximum access time for the information item and, on the other hand on more subjective criteria, fixed in general, by the user, the service provider or the manufacturer and relating for example to a usage priority level. The subjective criteria are used by the processing module (11) and the reorganization module (12) to determine to what extent certain objective criteria of the information item to be stored can be ignored, in full or part, so that the information item can be stored.

Thus, by way of example, if a first information item comprises a less important priority level than a second information item, the criteria, or objective constraints of the second information item, will be ignored in a more significant manner than the criteria or objective constraints of the first information item, so as to be able to store the second information item.

Likewise, during reorganization of the storage space by the reorganization module (12), the gaining of memory space on a given storage means can be achieved by at least partially ignoring the storage constraints of at least one information item, so as to shift this information item to another storage means or else by applying a compression algorithm.

The characteristics of the storage means (21, 22, 23) are gleaned by a third module called the evaluation module (13). This module (13) comprises means for interrogating each storage means so as to determine, in particular the space available, the access time and the processing speed of each of the storage means. These characteristics are then stored, for example in a table accessible by the processing module (11) and the reorganization module (12).

The third module (13) is triggered as soon as a new information item is stored on one of the storage means (21, 22, 23) or when a new storage means is connected to the television set or else when an existing storage means is replaced.

The processing module (11) and the reorganization module (12) also use a series of simple procedures to execute the storage of information or the optimization of the storing of this information. These procedures carry out, for example,:

erasure of data on a storage means, data compression, data decompression, recording of data on or writing of data to a storage means, searching for data on a storage means, shifting of data from a first storage means to a second storage means.

Examples of usage constraints and their implication in the memory management mechanisms will now be provided. All the constraints are stored, for example in a table consultable by the processing module (11) and the reorganization module (12).

The constraint relating to the size of the information item is provided by the service provider when requesting storage of an information item. When a compression is applied to a storage means, the size of the compressed information item is taken into account instead of the initial size. The modification of the table is then achieved, for example by the reorganization module (12) which is in fact the initiator of the compression operation.

The constraint or the information item relating to the date of expiry or the duration of validity is provided either by the service provider, upon the storage request, or by the user who decides to keep a given information item only for a desired duration or until a date fixed by him. Likewise, the date of expiry can be fixed by the user by fixing a duration of non-usage of the information item after which this information item can be deleted. The date of validity can be fixed for a particular information item, or for all the information items relating to a specified service. This constraint may, if necessary, be modified by the service provider or the user after the information item has been stored. This modification is carried out by the user by way of input means associated with the television set and controlled by the computer program or by the service provider by way of a communication link.

The constraint or the information item relating to the memory available on a storage means is updated by the evaluation module.

The constraint relating to the provider priority allows the user and the manufacturer of the television set to assign a priority level to each service provider. This priority level makes it possible to measure the importance of the information provided by a first provider relative to a second provider. This information item is used by the processing module and by the reorganization module to determine to what extent the usage constraints need to be complied with. Thus, for information provided by a service provider having an important priority level, no degradation of the usage conditions will be tolerated and all the usage constraints will have to be complied with. On the other hand, for information provided by a service provider having a lower priority level, non-compliance with these usage constraints will be permitted so as to allow compliance with the usage constraints for the information belonging to a service provider of more important priority.

The "service priority" constraint allows the user, the manufacturer of the television set and the service provider to assign a priority level to a service. This service is used in the same way and for the same purpose as the "provider priority" constraint.

The "information priority" constraint makes it possible to identify the information items which have a unique character and which cannot be retrieved once they have been deleted. These information items must therefore be identified so that they are not deleted.

The set of constraints related to the priorities can be modified after storing the information item by way of input means as defined earlier.

The "usual access" constraint for the information item represents the date or the period during which the information item can be used. This constraint is either fixed by the service provider or calculated by a specific procedure of the computer program, as a function of the date or of the period on or in which the information item is regularly used.

The "last access" constraint for an information item is determined by a specific procedure of the computer program (1). This procedure is triggered each time an information item stored is used to update the "last access" constraint for an information item. This constraint is used, on the one hand to calculate the "usual access" constraint for the information item and serves as a point of departure for determining whether an expiry time, fixed by the user with regard to this information item, has elapsed.

The "measured access time" constraint for an information item is calculated by the computer program by way of a specific procedure. This constraint makes it possible to evaluate the performance of the storage means.

The "required access time" constraint for an information item is fixed by the service provider in the request asking for storage of an information item.

By way of example, assignment of the various priorities is used when it is necessary to delete data so as to free some storage space.

This deletion is carried out by the reorganization module (12) while complying with the priority levels assigned to each datum stored and by following a hierarchy relating to the importance of one priority type relative to another.

By way of example, the reorganization module (12) processes the priorities in the following order of increasing priority:

information priority, service priority assigned by the user, service priority assigned by the manufacturer, service priority assigned by the provider, provider priority assigned by the user, provider priority assigned by the manufacturer.

Thus, the first items of information deleted will be those having the lowest information priority level, then that having the lowest level of service priority assigned by the user etc.

The deletion of the information stored on the means (21, 22, 23) can be carried out automatically, that is to say without user interrogation, or else semi-automatically, that is to say after systematic user validation.

The mode of deletion of data can be parameterized at any moment by the user, for example by way of a graphics interface of the program (1) for managing the television set.

Figure 2:
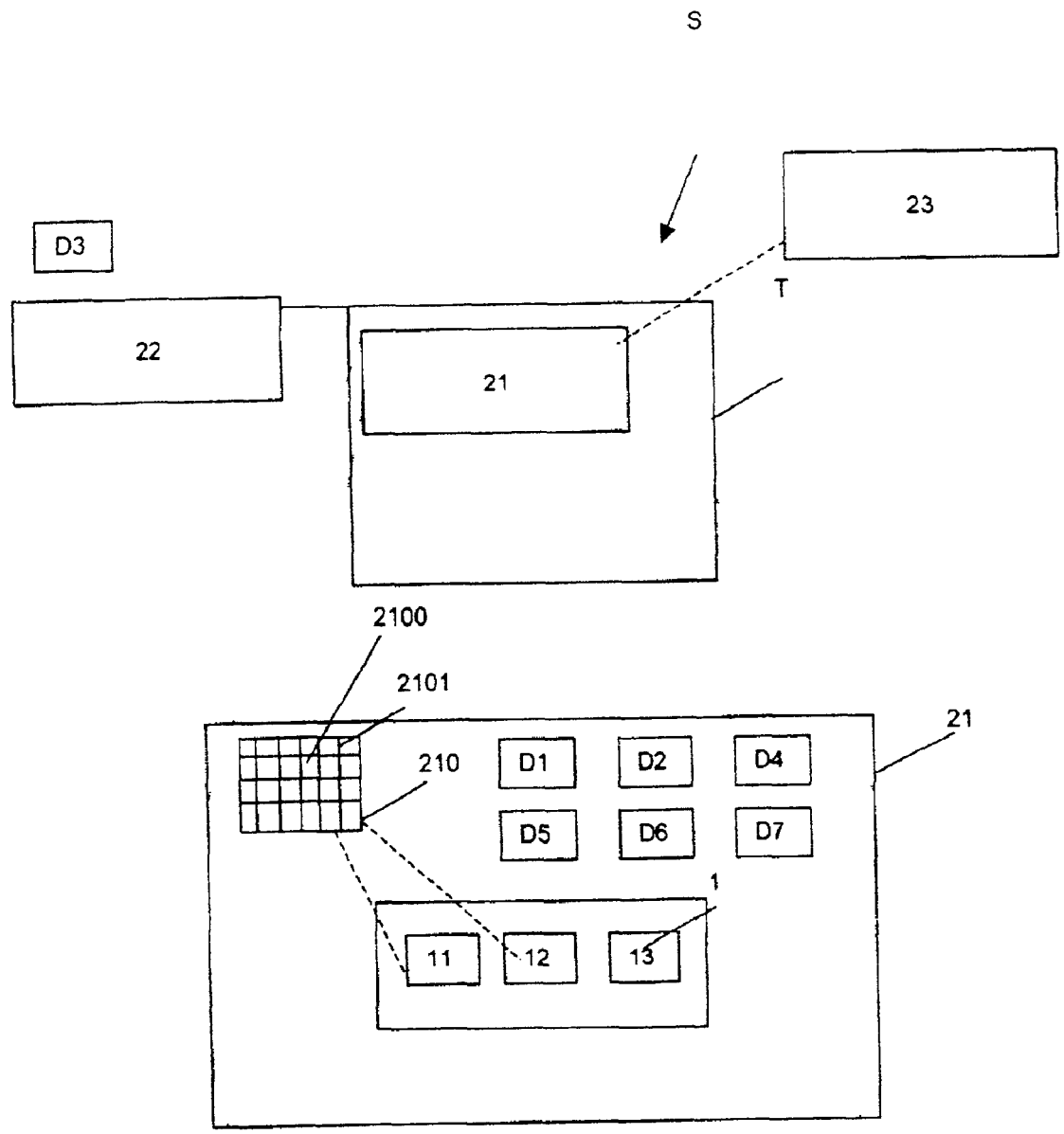
FIG. 2 schematically represents an exemplary usage of the invention in a configuration.

For a better understanding of the invention, an exemplary configuration will now be described with reference to FIG. 2. The television system (S) comprises in particular a television (T) using digital technology. The system (S) also comprises local storage means (21), such as a hard disk, installed in the television, external storage means (22), such as a memory card or a diskette reader, associated with the television or with the local storage means (21), and remote storage means (23), inside a network, for example.

The characteristics of the various storage means (21, 22, 23) are for example stored on the local storage means (21) in a table (210). By way of example the chart below collates the information contained in this table (210).

CHART No. 1

| Storage means | Local (L) | Associated (A) | Remote (R) |
|---|---|---|---|
| Space available (arbitrary unit) | 2 | 25 | 1000 |
| Access time (s) | 0 | 2 | 20 |
| Processing capacity (arbitrary unit/s) | 10 | 5 | 1 |

In this example, the user of the television set (T) has access to six interactive services (S1 to S6) provided by four different providers (P1 to P4). The services (S2, S5; S4, S6; S1, S3) are provided respectively by the providers (P2;, P3;, P1; P4). The first five services (S1 to S5 respectively) each require the storage of an information item (D1 to D5 respectively). The sixth service requires the storage of two information items (D6 and D7) each corresponding, for example to a distinct application of the same service (S6).

The two charts below summarize the constraints relating to the priority fixed by, respectively, the user, the provider and the manufacturer. The information contained in these two charts is stored for example in the table (210) of the local storage means (21) or in a distinct table.

The first chart (2100) represents the priorities assigned by the user and the manufacturer in respect of each service provider. The smaller the figure, the more important the priority level:

CHART No. 2

|  | P1 | P2 | P3 | P4 |
|---|---|---|---|---|
| Manufacturer priority | 2 | 2 | 1 | 2 |
| User priority | 3 | 1 | 2 | 2 |

The second chart (2101) represents the priorities assigned by the user, the manufacturer and the service provider in respect of each service (S1 to S6). The lower the figure, the more important the priority level. It is obvious that an access provider assigns a priority only in respect of the services which he provides:

CHART No. 3

|  | S1 | S2 | S3 | S4 | S5 | S6 |
|---|---|---|---|---|---|---|
| Provider | P1 | P2 | P4 | P3 | P2 | P3 |
| User priority | 3 | 3 | 1 | 2 | 2 | 3 |
| Provider priority | 1 | 2 | 2 | 1 | 1 | 2 |
| Manufacturer priority | 2 | 2 | 2 | 1 | 2 | 1 |

The above chart summarizes the placement of the information (D1 to D7) of the various services on the storage means.

CHART No. 4

| Information item | D1 | D2 | D3 | D4 | D5 | D6 | D7 |
|---|---|---|---|---|---|---|---|
| Service | S1 | S2 | S3 | S4 | S5 | S6 | S6 |
| Size | 5 | 5 | 30 | 15 | 10 | 10 | 5 |
| Provider date of validity | 8 days | Sep. 21, 1999 | 8d | 8d | 8d | 8d | 8d |
| User date of validity | 8d | 8d | 8d | 8d | 8d | 8d | 8d |
| Information priority | 1 | 1 | 1 | 1 | 1 | 1 | 2 |
| Access scheduled by provider |  | Wed |  |  | Sat |  |  |
| Access scheduled by manufacturer | Fri | Wed | Oct. 10, 1999 | 20h30 | Sat | Sat | Sat |
| Last access | Fri | Wed | Sep. 31, 1999 | 20h30 | Sat | Sat | Sat |
| Current access time | 0.5 | 0.5 | 8 | 1.5 | 1 | 1 | 0.5 |
| Desired access time | 1 | 1 | 1 | 1 | 1 | 1 | 1 |
| Storage site | L | L | R | L | L | L | L |

The abbreviation L signifies Local and corresponds to the local storage means (21), and the abbreviation R signifies Remote and corresponds to the associated storage means (22).

A reading of the above chart prompts the following remarks. The service S1 is a service requiring the parameterization of data specific to the user on the local storage means (21). Moreover, a specific procedure of the program (1) of the system according to the invention has determined that access to this service is made every Friday.

The date of validity of the service S2 is reached, this day Sep. 21, 1999.

The service S3 requires storage of personal data (D3) which are currently stored on the associated storage means (22).

The service S4 is used every evening at around 8h30.

The service S5 is a television transmission programmed every Saturday offering an interactive learning program and requiring the storage locally on the local storage means (21) of the results obtained by the user during the various lessons.

The service S6 is a telepurchasing service requiring on the one hand the storage of personal data (D6) and on the other hand the storage of a set (D7) of parameters accelerating the computer application associated with the service S6. In our example, the set (D7) of parameters does not constitute a priority information item.

Let us now assume that the user wishes to benefit from a new service (S7) offered by the fourth service provider (P4). The seventh service (S7) requires the storage of an eighth information item (D8), the characteristics of which are summarized in the chart 5 below:

CHART No. 5

| Information item | D8 |
|---|---|
| Service | S7 |
| Size | 20 |
| Provider date of validity | 8 days |
| User date of validity | 8d |
| Information priority | 1 |
| Access scheduled by provider | |
| Access scheduled by manufacturer | |
| Last access | |
| Current access time | 0.5 |
| Desired access time | 1 |
| Storage site | L |

In view of the desired access time, the eighth information item (D8) can only be stored on the local storage means (21). But these means are saturated since according to Chart No. 1 there are only two units of storage remaining, whereas the eighth requires 20 units of storage.

The processing module (11) receiving the storage request cannot therefore respond to this request without modifying the organization of the information previously stored. Consequently, the processing module (11) triggers the reorganization module (12) so as to release some space on the local storage means (21).

The analysis carried out by the reorganization module (12) reveals that the information (D2) corresponding to the second service (S2) can be deleted since the date of validity of this service (S2) has expired. Therefore, 5 units of storage are freed on the local storage means (21). The first service (S1) will only be used this Friday and the sixth service (S6) will only be used this Saturday. Consequently, the data (D1, D6, D7) corresponding to these services (S1, S6) can be shifted onto the associated storage means (22), the latter not being saturated. This action therefore makes it possible to free 15 additional units of storage on the local storage means (21), thus making it possible to obtain the 20 units of storage required to store the information item (D8) corresponding to the new application of the third service (S3).

It should be obvious to persons versed in the art that the present invention allows embodiments in numerous other specific forms without departing from the field of application of the invention as claimed. Consequently, the present embodiments must be regarded as by way of illustration, but may be modified within the field defined by the scope of the appended claims, and the invention should not be limited to the details given hereinabove.

What is claimed is:

1. Television receiver furnished with a memory intended to contain service data, wherein it furthermore includes means for receiving said service data and usage criteria associated with the usage of these service data, a processing module able to correlate the usage criteria of said service data and storage criteria characterizing the memory with a view to determining the kind of memory used for the storage of the service data in said memory, wherein said memory includes an internal memory, an external memory connected to the receiver and a remote memory accessible via a network, the processing module being activated automatically on receipt of said service data and the associated usage criteria.

2. Television receiver according to claim 1, wherein it furthermore includes an evaluation module for determining the characteristics of said at least one memory and for including the characteristics thus determined in the storage criteria.

3. Television receiver according to claim 1, wherein it furthermore comprises a reorganization module analyzing the storage criteria so as to trigger a procedure for reorganizing the allocation of the stored information so as to free some space in the memory while complying with the usage criteria of the stored service data.

4. Television receiver according to claim 2, wherein it furthermore comprises a reorganization module analyzing the storage criteria so as to trigger a procedure for reorganizing the allocation of the stored information so as to free some space in the memory while complying with the usage criteria of the stored service data.

5. Television receiver according to claim 1, wherein the memory is of retentive type.

6. Process for managing a memory of a television receiver wherein it includes the following steps:

receiving service data and usage criteria associated with the usage of these data, searching in the receiver for storage criteria characterizing the memory, and following the reception and the searching step, correlating the usage and storage criteria with a view to determining the kind of memory used for storage of the service data in said memory, wherein said memory includes an internal memory, an external memory connected to the receiver, and a remote memory accessible via a network.

7. Process for managing a memory according to claim 6, wherein it includes a step of evaluating the state and the characteristics of the memory so as to determine the storage criteria.

8. Process for managing a memory according to claim 6, wherein it furthermore includes a step of reorganizing said memory consisting in freeing some room in memory.

9. Process for managing a memory according to claim 8, wherein the reorganizing step is triggered when the available space remaining in memory is insufficient to hold the data received.

10. Process for managing a memory according to claim 8, wherein the reorganizing step is activated automatically during periods of non-usage of the receiver and/or upon the activation of a service data storage request.

11. Process for managing a memory according to claim 8, wherein the reorganizing step includes an operation of compressing the data in the memory followed by an operation of storing the data thus compressed.

12. Process for managing a memory according to claim 8, wherein the reorganizing step includes a step of transferring the data to an external or remote memory of the television receiver.

* * * * *